W. L. COPELAND.
COMBINED FORK AND RAKE.
APPLICATION FILED MAY 15, 1908.
903,678.
Patented Nov. 10, 1908.
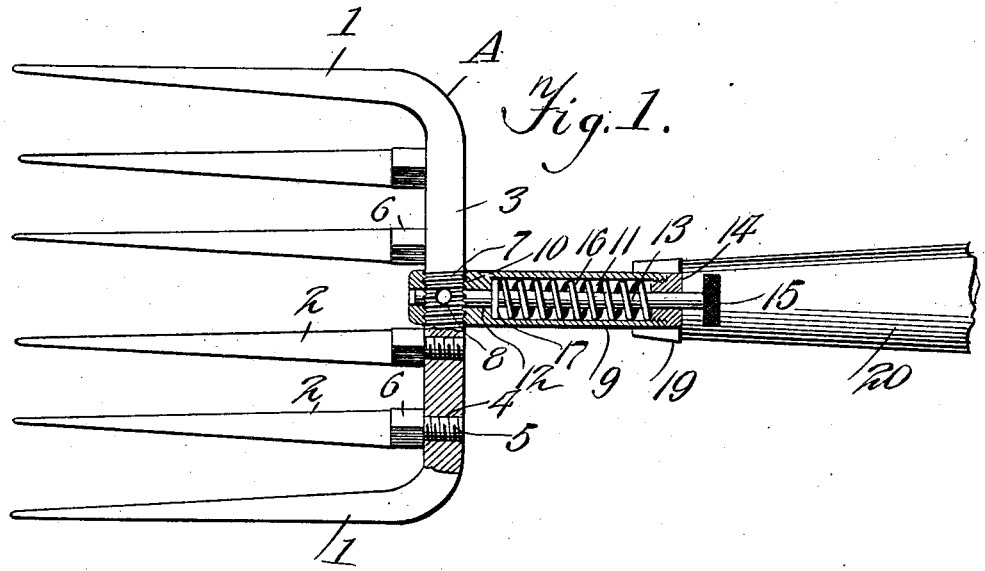
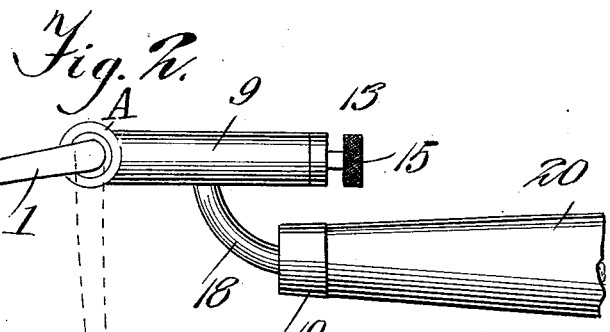
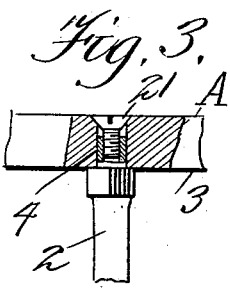
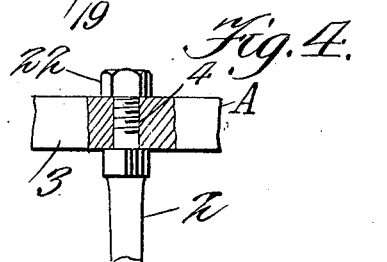
Witnesses
Addison W. Smith
C. Bradway.
Inventor
Wister L. Copeland
By Victor J. Evans
Attorney

UNITED STATES PATENT OFFICE.

WISTER L. COPELAND, OF TIMMONSVILLE, SOUTH CAROLINA.

COMBINED FORK AND RAKE.

No. 903,678.     Specification of Letters Patent.     Patented Nov. 10, 1908

Application filed May 15, 1908. Serial No. 433,080.

*To all whom it may concern:*

Be it known that I, WISTER L. COPELAND, a citizen of the United States, residing at Timmonsville, in the county of Florence and State of South Carolina, have invented new and useful Improvements in a Combined Fork and Rake, of which the following is a specification.

This invention relates to a stable, farm or other implement which is readily convertible into a fork, rake or potato hook.

The invention has for one of its objects to improve and simplify the construction of devices of this character so as to be comparatively easy and inexpensive to manufacture, of durable and substantial design, and composed of comparatively few parts.

Another object of the invention is the provision of a convertible implement having a simple and effective means for locking the head in different positions with respect to the handle, so that the implement can be used as a fork or as a rake.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a plan view of the implement partly in section. Fig. 2 is a side view thereof showing the head in full lines for use as a fork, and in dotted lines for use as a rake or potato hook. Figs. 3 and 4 are detail sectional views showing modifications of means for fastening the intermediate tine to the cross bar.

Similar reference characters are employed to designate corresponding parts throughout the views.

Referring to the drawing, A designates the head of the implement which, in the present instance, comprises outer tines 1 and intermediate tines 2 that are secured to the cross bar or connecting portion 3 that forms an integral part of the outer tines 1. The connecting portion or bar 3 has parallel spaced openings 4 that are tapped to receive the threaded stud portions 5 of the intermediate tines 2, the tines having non-circular portions 6 for the reception of a wrench whereby the tines can be inserted or removed. The outer tines and connecting bar 3 form substantially a U-shaped structure made of a single length of rod and the middle of this rod is provided with a thread 7, and the cross bar has transverse openings 8 arranged approximately at right angles to each other for the purpose hereinafter to appear.

The head A of the implement is mounted in a shank 9 that has a transverse opening 10 which is threaded for receiving the threaded portion of the cross bar 3, the said cross bar being inserted before one of the outer tines 1 is bent. This threaded connection between the shank 9 and head A prevents relative lateral movement between the parts. The shank 9 is hollow at its outer end to form a chamber 11 and is provided with a bore 12 at its opposite end which is adapted to register with either opening 8 in the cross bar 3 of the head and in this bar is a locking pin or rod 13 that is adapted to engage in one or the other opening 8 for rigidly holding the head A in the full or dotted line position, Fig. 2. The outer end of the pin 13 passes through a bushing 14 threaded in the supporting member 9 and is equipped with a knob 15 whereby the pin can be readily manipulated, there being a helical compression spring 16 within the chamber 11 which bears on one end of the bushing 14 as the stationary abutment and at its opposite end on a collar 17 on the locking pin 13 so as to hold the latter in locking position. Integrally connected with the shank 9 is a stem 18 that carries a ferrule 19 that fits on the handle 20 of the implement, the stem 18 being a quadrant of a circle and supporting the member 9 in parallelism with the handle 20.

In converting the device for different uses, it is merely necessary to pull outwardly on the knob 20 so as to withdraw the locking pin 13 from the opening 8 of the head so as to thereby permit the head to be turned from the dotted to the full line position, Fig. 2, or vice versa. After the head is adjusted to the proper point, the knob 15 is released so as to cause the pin 13 to be engaged in the other opening 8 by the extension of the spring 16. The spring will hold the pin in locking position and the pin coöperates with the thread 7 to rigidly hold the head in position.

Instead of securing the intermediate tines 2 by screwing them into the cross bar 3, as shown in Fig. 1, they may be fastened by means of screws 21, as shown in Fig. 3, or by nuts 22, as shown in Fig. 4, the advantage being that should any tooth break off close to the cross bar, the remaining portion can be removed more readily.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the appended claims.

Having thus described the invention, what I claim is:—

1. In an implement of the class described, the combination of a head having a cross bar provided with tranversely-extending openings arranged at an angle to each other, a shank on which the head is mounted for rotary adjustment, a longitudinally-movable locking pin mounted on the shank and adapted to engage in either opening of the said cross bar, means for holding the pin yieldingly in locking position, a stem extending from the shank, and a handle connected with the stem and disposed in offset relation to the shank.

2. In an implement of the class described, the combination of a head comprising a single piece member formed into tines and a connecting cross bar, said cross bar having spaced openings and provided with a thread, a shank having a threaded transverse opening into which the head is inserted, a locking pin disposed within the shank and arranged to engage in either opening of the said head, and a handle connected with the shank.

3. In an implement of the class described, the combination of a head comprising a cross bar having central openings arranged at an angle to each other and transverse openings spaced from each other, outer tines on the extremities of the cross bar, removable intermediate tines secured in the said transverse openings, and a central thread on the cross bar, with a shank having a transverse threaded opening for receiving the threads on the cross bar and provided with a chamber and a bore alining with the central openings of the cross bar, a locking pin slidably mounted in the bore and extending out of the chamber, a removable abutment on the shank at the outer end of the chamber, a collar adjacent the inner end of the locking pin, a spring in the chamber bearing on the collar and abutment for holding the pin in locking position, a grip on the outer end of the stem, a handle, and means for connecting the shank with the handle.

In testimony whereof I affix my signature in presence of two witnesses.

WISTER L. COPELAND.

Witnesses:
 B. R. ATKINSON,
 B. R. COPELAND.